United States Patent
Yoshida et al.

(10) Patent No.: US 6,516,824 B2
(45) Date of Patent: Feb. 11, 2003

(54) APPARATUS AND METHOD FOR METERING DELIVERY QUANTITY OF ULTRA-LOW TEMPERATURE LIQUEFIED GAS

(75) Inventors: Keijiro Yoshida, Tokyo (JP); Tatsuya Hasegawa, Niigata Pref. (JP)

(73) Assignees: Mitsubishi Heavy Industries, Ltd., Tokyo (JP); Nihonkai LNG Co., Ltd., Kitakanbara-gun (JP)

( * ) Notice: Subject to any disclaimer, the term of this patent is extended or adjusted under 35 U.S.C. 154(b) by 191 days.

(21) Appl. No.: 09/756,189

(22) Filed: Jan. 9, 2001

(65) Prior Publication Data

US 2001/0025655 A1 Oct. 4, 2001

(30) Foreign Application Priority Data

Mar. 24, 2000 (JP) .......................................... 2000-083909

(51) Int. Cl.⁷ .................................................. G05D 7/06
(52) U.S. Cl. ........................ 137/2; 137/485; 137/487.5; 137/563; 62/50.1
(58) Field of Search ............................. 137/2, 485, 486, 137/487.5, 563; 62/50.1

(56) References Cited

U.S. PATENT DOCUMENTS

| | | | | | |
|---|---|---|---|---|---|
| 3,690,115 | A | * | 9/1972 | Clayton | ............... 137/487.5 X |
| 5,228,295 | A | * | 7/1993 | Gustafson | ................ 62/50.1 X |
| 5,353,849 | A | * | 10/1994 | Sutton et al. | .................. 141/44 |
| 5,771,946 | A | * | 6/1998 | Kooy et al. | ............... 62/50.2 X |

* cited by examiner

*Primary Examiner*—Kevin Lee
(74) *Attorney, Agent, or Firm*—Oblon, Spivak, McClelland, Maier & Neustadt, P.C.

(57) ABSTRACT

In the apparatus or method in accordance with the present invention, an ultra-low temperature liquefied gas is circulated in a flow path from a storage element 101 to the storage element 101, the loading quantity of flow and the return quantity of flow to the storage element 101 are measured by at least two flowmeters 103 and 104 provided in the flowpath, and the ultra-low temperature liquefied gas is supplied to a transportation element 105 through a flow path provided between the two flowmeters 103 and 104.

7 Claims, 2 Drawing Sheets

US 6,516,824 B2

APPARATUS AND METHOD FOR METERING DELIVERY QUANTITY OF ULTRA-LOW TEMPERATURE LIQUEFIED GAS

BACKGROUND OF THE INVENTION

Field of the Invention

The present invention relates to an apparatus and method for metering delivery quantity of an ultra-low temperature liquefied gas.

For example, liquefied natural gas (hereinafter referred to as LNG), which is an ultra-low temperature liquefied gas, is used for power generation and the like. It is usually cooled and stored at about −162° C., and is delivered by means of a tank lorry or a container-type LNG tank. On the delivery of LNG, the flow rate in loading is regulated manually, and also metering is performed using a truck scale.

Conventionally, for example, as shown in FIG. 2, after the pressure of LNG is reduced to about 0.4 MPa(G) by using a pressure reducing valve 201, loading work has been performed while the flow rate is directly regulated by manual operation or a flow indicating controller (FIC) 202 is set appropriately by manual operation.

On the other hand, LNG produces much gas unless the cooling temperature thereof is kept, resulting in hindrance to the loading operation. Therefore, a circulation path for LNG gas is provided separately from a path for loading operation so as to return LNG gas to an LNG tank (not shown) as a return gas through a throttle valve 203. Thereby, the temperature of a pipe just before the flow indicating controller 202 is kept low. With the progress in the operation for loading LNG into a tank lorry 204, a gas component produced along with the loading operation is discharged into a pipe 205.

Before and after the loading operation, a purge gas such as nitrogen gas having an original pressure of about 0.7 MPa(G) is sent into a loading flow path, and is then sealed in under a pressure of about 0.2 MPa (G) to maintain the dried condition in the pipe.

When such a loading operation as shown in FIG. 2 is performed, the metering of delivery quantity has been performed by metering the tank lorry 204 before and after the loading operation by using the truck scale.

Therefore, the tank lorry 204 must be caused to pass through the truck scale before and after the receipt of LNG, which is troublesome in operation. Especially when the tank lorry 204 is caused to pass through the truck scale without backward motion or when an arrangement plan for causing the tank lorry 204 to pass through a loading island is made, there is a problem of increased constraint. Also, an operator's job for monitoring and regulating the delivery quantity is needed, so that the burden in operation is heavy.

On the other hand, for petroleum and LPG (propane gas), an automatic loading system has been used. In this system, the quantity of flow of loaded LPG and the quantity of flow of return gas are measured, and the integrated value of the difference therebetween is obtained automatically as the delivery quantity. However, for LNG, which has a very low boiling point, unless a delivery quantity metering system is sufficiently cooled in advance, gas is liable to be produced. Therefore, even if the automatic loading system for LPG is used as it is, the metering accuracy cannot be obtained, so that the automatic loading system has not been used for LNG so far.

SUMMARY OF THE INVENTION

The present invention has been made in view of the above situation, and accordingly an object thereof is to provide an apparatus for metering delivery quantity of an ultra-low temperature liquefied gas that realizes an automatic metering loading system and a method therefor.

Specifically, in the present invention, there is provided a flow path for performing an operation for circulating the ultra-low temperature liquefied gas before the start of loading from two viewpoints of precooling a metering system and maintaining the measurement range of a loading flowmeter, and the circulation (return) quantity of flow is deducted from the loading quantity of flow, by which highly accurate automatically integrated metering is realized in all processes for delivery.

In one aspect of present invention, there is provided an apparatus for metering delivery quantity of an ultra-low temperature liquefied gas delivered from a storage element to a transportation element, comprising a flow path for the ultra-low temperature liquefied gas circulating from the storage element to the storage element; at least two flowmeters provided in the flow path; and a flow path, which is provided between the two flowmeters, for supplying the ultra-low temperature liquefied gas to the transportation element.

The apparatus for metering delivery quantity of an ultra-low temperature liquefied gas in accordance with the present invention preferably comprises a gas flowmeter provided in a flow path for return gas returned from the transportation element. Further, in the present invention, there is preferably provided a batch controller for monitoring the flow information sent from the flowmeters, whereby fully automatic control is accomplished. Also, the flowmeters preferably are what we call a Coriolis-type flowmeter.

In another aspect of the present invention, there is provided a method for metering delivery quantity of an ultra-low temperature liquefied gas in another aspect. Specifically, it provides a method for metering delivery quantity of an ultra-low temperature liquefied gas delivered from a storage element to a transportation element, comprising the steps of circulating the ultra-low temperature liquefied gas in a flow path from the storage element to the storage element; measuring the loading quantity of flow to the transportation element and the return quantity of flow to the storage element by using at least two flowmeters provided in the flow path; and supplying the ultra-low temperature liquefied gas to the transportation element through a flow path provided between the two flowmeters.

The method for metering delivery quantity of an ultra-low temperature liquefied gas in accordance with the present invention preferably comprises the step of measuring the quantity of return gas by using a gas flowmeter provided in a flow path for return gas returned from the transportation element. Further, in the present invention, the flow information sent from the flowmeters is preferably monitored by a batch controller, whereby fully automatic control is accomplished.

In the specification and in the attached claims, "ultra-low temperature liquefied gas" is a concept including liquid nitrogen, liquid oxygen, liquid ethylene, and the like in addition to LNG.

In the specification and in the attached claims, "storage element" means a vessel for storing an ultra-low temperature liquefied gas, and generally means a storage tank.

In the specification and in the attached claims, "transportation element" means a means for transporting an ultra-low temperature liquefied gas, and generally means a tank lorry or a container-type ultra-low temperature liquefied gas storage tank.

BRIEF DESCRIPTION OF THE DRAWING

An embodiment of an apparatus and method for metering delivery quantity of an ultra-low temperature liquefied gas in accordance with the present invention will now be described with reference to the embodiment shown in the accompanying drawing.

DETAILED DESCRIPTION OF THE PREFERRED EMBODIMENT

An embodiment of an apparatus and method for metering delivery quantity of an ultra-low temperature liquefied gas in accordance with the present invention will now be described with reference to the embodiment shown in the accompanying drawing.

Figure 1:
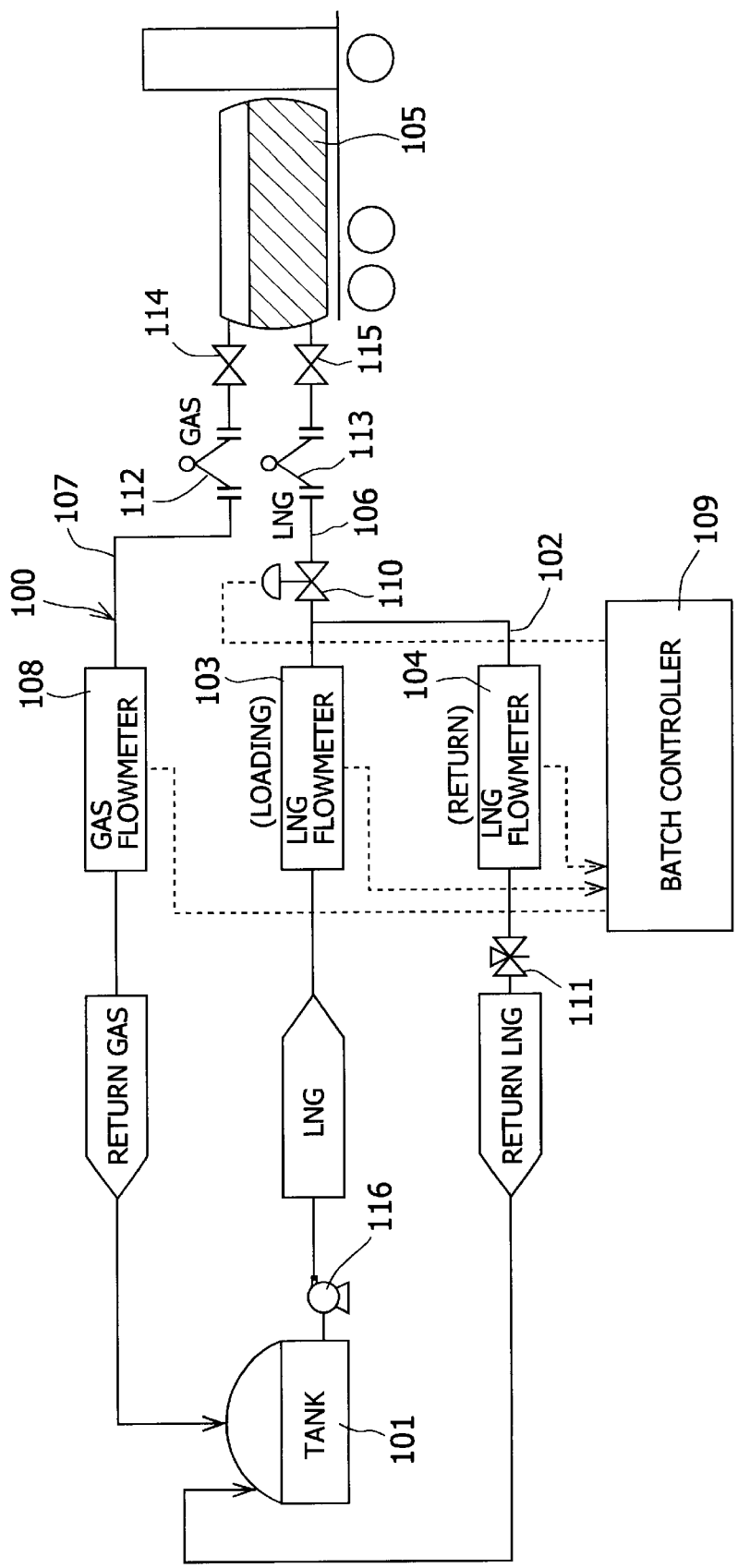
FIG. 1 is a schematic diagram for illustrating one embodiment of an apparatus for metering delivery quantity of an ultra-low temperature liquefied gas in accordance with the present invention.
Figure 2:
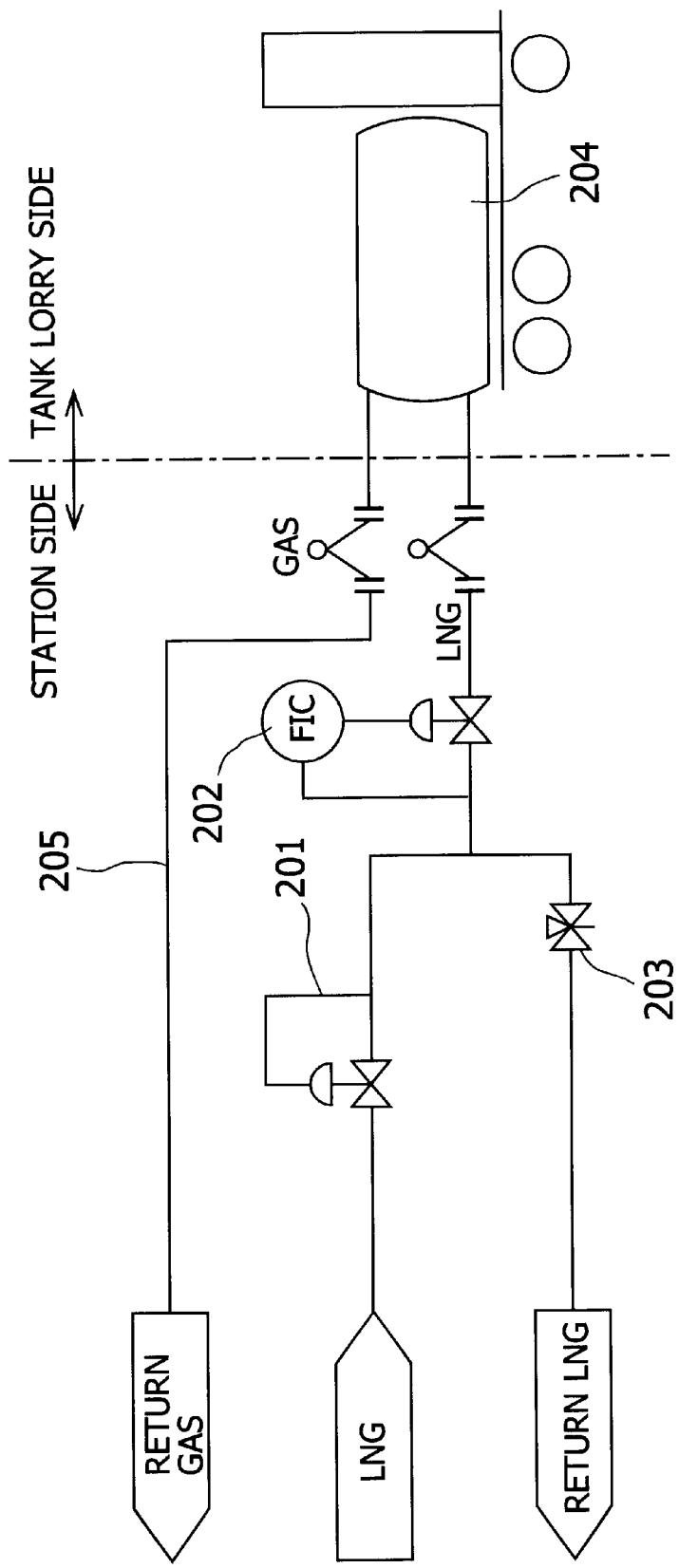
FIG. 2 is a schematic diagram for illustrating a conventional apparatus for metering delivery quantity of an ultra-low temperature liquefied gas.

FIG. 1 shows one embodiment in which an apparatus for metering delivery quantity of an ultra-low temperature liquefied gas in accordance with the present invention is used as a delivery quantity metering apparatus for LNG.

In this embodiment, a storage tank 101 is provided as a storage element, and a tank lorry 105 is used as a transportation element. A flow path 102 is an LNG circulation flow path for circulating LNG from the outlet of the storage tank 101 toward the storage tank 101. The flow path 102 is provided with an LNG flowmeter 103 for measuring the loading quantity of flow and an LNG flowmeter 104 for measuring the return quantity of flow.

Between these two flowmeters 103 and 104, there is provided a flow path for supplying LNG to the tank lorry 105.

Further, a return gas flow path 107 is provided to return gas from the tank lorry 105. The return gas flow path 107 is provided with a gas flowmeter 108 for measuring the quantity of flow of return gas.

The return gas and return LNG returned to the storage tank 101 are returned to a gas phase portion nozzle of the storage tank 101, and the LNG is sent out of a liquid phase portion by using a pump 116.

A delivery quantity metering apparatus 100 in accordance with this embodiment is further provided with a batch controller 109. The batch controller 109 monitors the loading condition and accomplishes main control for automatically metering the delivery quantity by obtaining information from the three flowmeters 103, 104 and 108.

Further, a control valve 110 is a valve for accomplishing the control of flow rate by being controlled automatically by the batch controller 109. Also, a throttle valve 111 regulates and maintains a flow of circulated LNG of a sufficient amount necessary for precooling the metering system and for maintaining the measurement range of the loading flowmeter.

In addition to the above description, the apparatus for metering delivery quantity of LNG in accordance with this embodiment includes facilities necessary for delivery, which are similar to those in the conventional apparatus. Such facilities are obvious to a person skilled in the art, so that the explanation thereof is omitted.

Next, one embodiment of a method for metering delivery quantity by using the apparatus for metering delivery quantity of LNG in accordance with this embodiment that is configured as described above is explained.

First, in this embodiment, LNG is circulated in the flow path 102 from the outlet of the storage tank 101 to the storage tank 101. Thereby, the flow path 102 is fully cooled so that the gasification of LNG sent to the tank lorry 105 in the loading flow path is minimized, which enables rapid loading of liquid. By this circulation, LNG is caused to pass through the LNG flowmeters 103 and 104 before the loading operation, so that the LNG flowmeters are fully cooled. Therefore, a problem of gasification of LNG does not occur, so that highly accurate metering can be performed.

When the loading operation is started, the tank lorry 105 is connected to the delivery quantity metering apparatus 100 via arms 112 and 113 having a connection flange and valves 114 and 115.

During the loading operation, LNG is supplied to the tank lorry 105 through the flow path 106 while the loading quantity of flow and the return quantity of flow to the storage tank 101 are always measured automatically by the flowmeter 103 and the flowmeter 104 provided in the flow path 102, respectively. Also, the quantity of flow of return gas returned from the tank lorry 105 is measured by the gas flowmeter 108.

The flow information sent from these flowmeters 103, 104 and 108 is monitored by the batch controller 109. Thereby, an exact quantity of flow to the tank lorry 105 can be obtained by automatically deducting the quantity of flow of return LNG returned to the storage tank 101 and the quantity of flow of return gas returned from the tank lorry 105 from the loading quantity of flow. By keeping the quantity of flow of return LNG not smaller than the measurement lower limit range of the loading LNG flowmeter, even a small quantity of flow can be metered with high accuracy at the time of loading start and just before the completion of loading.

Thus, the batch controller 109 automatically controls the control valve 110 using an incorporated electronic controller based on the flow information sent from the flowmeters 103, 104 and 108 to exactly meter the quantity of delivery to the tank lorry 105.

The flowmeters 103, 104 and 108 preferably are what we call a Coriolis-type flowmeter. The Coriolis-type flowmeter is a mass flowmeter, which exactly measures a mass flow rate from the torsion and deflection of two S-shaped pipes caused by a Coriolis force acting on the S-shaped pipes vibrated by an electromagnetic force, for example.

The measurement principle is based on Newton's second law of [F (force)=m (mass)×α(acceleration)].

When a liquid mass (m) flows in the vibrating pipes at a certain flow velocity (V), an acceleration α acts in the perpendicular direction with respect to the flow direction. As a result, a Coriolis force (Fc) is created. The Coriolis force produces a torsion and deflection phenomenon on the vibrating S-shaped pipes, the magnitude thereof being proportional to the mass flow rate.

An operation sensor provided at positions symmetrical with respect to the central portion of S-shaped pipe carries out position detection due to torsion and deflection at each position and outputs the result. At the same time, this torsion and deflection phenomenon produces a time shift of output value at the position of each operation sensor. Specifically, if a time shift (phase difference) of the output value is detected, a signal proportional to the mass flow rate can be generated.

The detection signal can be output by being converted into an output signal proportional to the flow rate by a converter. Also, the vibration frequency of the S-shaped pipe varies with the density of liquid, so that a change in frequency is detected by a converter, and can be output as a density signal.

Further, the method for metering delivery quantity of LNG in accordance with the above-described embodiment will be described in terms of operation procedure.

First, the arms 112 and 113 are installed to the tank lorry 105, and a purge gas such as $N_2$ (gas pressure: about 0.2 MPa(G)) is fed to dry the flow path.

Then, an operation switch is turned on to start automatic operation.

In the automatic operation, the return gas valve in the flow path 107 is fully opened so that the tank pressure in the tank lorry 105 is reduced from about 0.4 MPa(G) to about 0.1 MPa(G) or lower.

Then, the valve on the LNG side is opened gradually. This valve is gradually brought into a fully opened state. When 90% of the preset loading quantity is reached, the loading speed is decreased gradually. When the preset loading quantity is reached, the operation is stopped.

Next, LNG in the arm 113 is pushed in by the purge gas to perform purging again, and the arms 112 and 113 are removed. This operation can be excluded from the automatic operation, but this case is also included in the category of full automation.

The embodiment shown in FIG. 1 relates to liquefied natural gas. However, this embodiment can be applied to other ultra-low temperature liquefied gases.

As is apparent from the above description, according to the present invention, there are provided an apparatus and method for metering delivery quantity of an ultra-low temperature liquefied gas that have realized an automatic metering loading system. Specifically, excellent results described below can be anticipated.

(1) An ultra-low temperature liquefied gas is caused to pass through the flowmeters for the ultra-low temperature liquefied gas before the loading operation, so that the flowmeters are fully cooled. Therefore, a problem of gasification does not occur, so that highly accurate metering can be performed.

(2) By keeping the return quantity of flow not smaller than the measurement lower limit range of the flowmeter for the loading ultra-low temperature liquefied gas, even a small quantity of flow can be metered with high accuracy at the time of loading start and just before the completion of loading.

(3) Thus, the automation of loading work process including purging and cooling-down after the work for connecting the pipe to the tank lorry and the configuration of a system without the use of a truck scale become possible. Thereby, the metering using a truck scale is unnecessary, so that the number of transfers of the tank lorry is decreased, thereby achieving simple and high-speed operation. Thus, since the metering using a truck scale is unnecessary, the arrangement plan relating to the admission, standby, reception, and leaving route of tank lorry is less restricted.

(4) Since the loading operation of ultra-low temperature liquefied gas can be automated, the operator's burden is lessened, and loading to many vehicles can be performed by only a few operators.

Although the present invention has been described with reference to the embodiment shown in FIG. 1, it is not limited to this embodiment. All modifications, changes, and additions that are easily made by a person skilled in the art are embraced in the technical scope of the present invention.

The disclosure of Japanese Patent Application No. 2000-083909 filed on Mar. 24, 2000 including the specification, the claims, the drawings, and the abstract is incorporated herein by reference with its entirety.

What is claimed is:

1. An apparatus for metering delivery quantity of an ultra-low temperature liquefied gas delivered from a storage element to a transportation element, comprising a flow path or the ultra-low temperature liquefied gas circulating from said storage element to said storage element; at least two flowmeters provided in said flow path; and a flow path, which is provided between said two flowmeters, for supplying the ultra-low temperature liquefied gas to said transportation element.

2. The apparatus for metering delivery quantity of an ultra-low temperature liquefied gas according to claim 1, wherein said apparatus further comprises a gas flowmeter provided in a flow path for return gas returned from said transportation element.

3. The apparatus for metering delivery quantity of an ultra-low temperature liquefied gas according to claim 2, wherein said apparatus further comprises a batch controller for automatically controlling said metering apparatus based on the flow information sent from said two flowmeters and said gas flowmeter.

4. The apparatus for metering delivery quantity of an ultra-low temperature liquefied gas according to any one of claims 1 to 3, wherein the ultra-low temperature liquefied gas is a liquefied natural gas.

5. A method for metering delivery quantity of an ultra-low temperature liquefied gas delivered from a storage element to a transportation element, comprising the steps of circulating the ultra-low temperature liquefied gas in a flow path from said storage element to said storage element; measuring the loading quantity of flow to said transportation element and the return quantity of flow to said storage element by using at least two flowmeters provided in said flow path; and supplying the ultra-low temperature liquefied gas to said transportation element through a flow path provided between said two flowmeters.

6. The method for metering delivery quantity of an ultra-low temperature liquefied gas according to claim 5, wherein the supply of ultra-low temperature liquefied gas to said transportation element is automatically controlled by a batch controller based on the flow information sent from said two flowmeters and a gas flowmeter provided in a flow path for return gas returned from said transportation element.

7. The method for metering delivery quantity of an ultra-low temperature liquefied gas according to claim 5 or 6, wherein the ultra-low temperature liquefied gas is a liquefied natural gas.

* * * * *